Dec. 8, 1931.        L. G. ROWAND ET AL        1,835,530
DRIER
Filed June 3, 1929        3 Sheets-Sheet 2

INVENTOR
Lewis G. Rowand
Jackson S. Pellett
BY
ATTORNEYS

Dec. 8, 1931. L. G. ROWAND ET AL 1,835,530
DRIER
Filed June 3, 1929 3 Sheets-Sheet 3
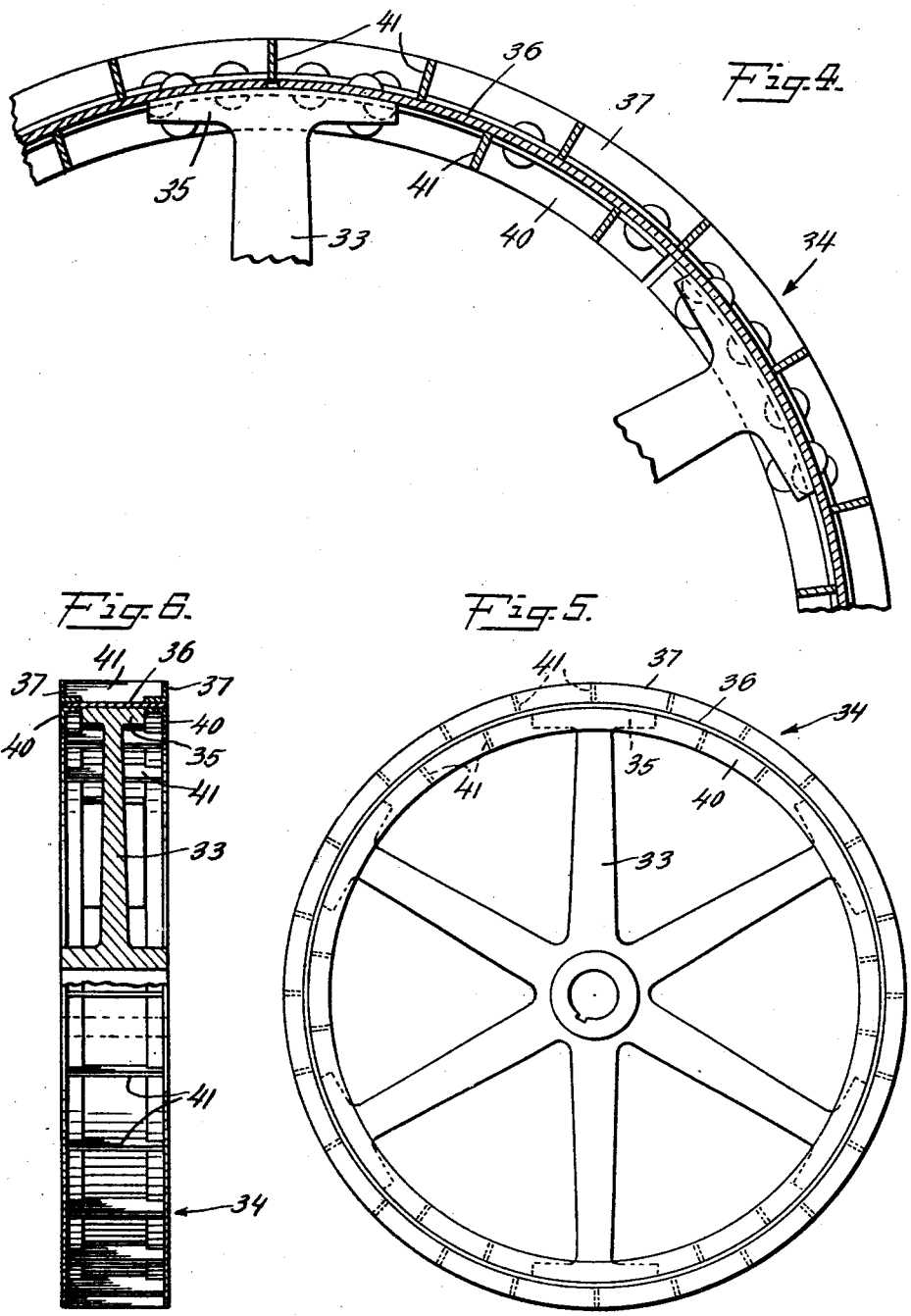
INVENTOR
Lewis G. Rowand
Jackson S. Pellett
BY
ATTORNEYS Patented Dec. 8, 1931

1,835,530

UNITED STATES PATENT OFFICE

LEWIS G. ROWAND, OF BROOKLYN, NEW YORK, AND JACKSON S. PELLETT, OF FRANKLIN, NEW JERSEY, ASSIGNORS TO THE NEW JERSEY ZINC COMPANY, OF NEW YORK, N. Y., A CORPORATION OF NEW JERSEY

DRIER

Application filed June 3, 1929. Serial No. 367,890.

This invention relates to driers and has for an object the provision of an improved arrangement of apparatus for drying finely divided material. More particularly the invention relates to tower driers of the type used for drying finely divided ores, concentrates and the like, and in which drying gases and materials to be dried are passed through the drier in counter-current relationship.

According to some present practices, tower driers are provided with stationary baffles extending between opposite side walls of the tower for retarding the downward movement of materials to be dried. In such apparatus bridging of the wet material between adjacent baffles and between the baffles and the tower walls is unavoidable and troublesome even when a considerable proportion of the wet material is relatively coarse, and it is particularly common and troublesome when the material being dried is relatively fine. The bridging of materials in driers prevents intimate contact of the drying gases with the wet material and results in a great loss in efficiency through loss of heat and reduced capacity of the drier.

The present invention contemplates the provision of improved baffle means for drying apparatus by means of which objectionable bridging of wet materials may be prevented. The present invention further contemplates the provision of improved drying apparatus comprising a drying chamber, means for feeding finely divided materials to the drying chamber, means for generating and introducing drying gases into the drying chamber, and improved baffle means for bringing the finely divided materials into intimate contact with the drying gases.

Complete drying apparatus constructed in accordance with the present invention preferably comprises a vertical drying tower having rotary baffles mounted therein, a combustion chamber provided with a travelling grate stoker, a gas flue for supplying hot gases to the vertical drying tower and having one or more passages communicating with the interior of the vertical drying tower at appropriate points, and feeding means adjacent the top of the vertical tower so constructed and arranged that the material to be dried may be admitted to the interior of the drier without permitting ingress or egress of gases.

The baffles are preferably arranged in vertically spaced groups and mounted in the upper portion of the drying tower. One or more passages providing means of communication between the gas flue and the interior of the vertical drying tower are provided in order to secure a more uniform drying temperature. One passage is preferably located adjacent the bottom of the tower and beneath the lowermost baffles. A second passage may be located approximately midway between the top and the bottom of the tower and preferably admits gases to the interior of the tower between two adjacent groups of baffles. When two passages are provided, the uppermost passage is preferably smaller than the lowermost passage to provide for proper distribution of the gases. Means may be provided for regulating the sizes of the passages or for closing one of the passages in order to control the flow of heating gases.

The provision of at least two vertically spaced passages for the introduction of hot gases is preferable in order to prevent condensation on the incoming material of the vapors generated in the hottest portions of the drier. The lowermost passage is preferably disposed adjacent the bottom of the drying chamber, and the uppermost passage is disposed at such a point between the bottom and top of the drying chamber that the moisture laden gases passing upwardly may be maintained at a temperature sufficiently high to prevent condensation of the vapors before the gases are discharged. A separate combustion chamber may be provided for each gas entrance passage instead of a single combustion chamber and a flue communicating with the combustion chamber and all of the passages.

The combustion gases for heating purposes may be obtained by burning any suitable type of material, such, for example, as coal, oil, or gas. In the event that more than one combustion chamber is provided, they may all be fired with the same combustion supporting materials, or different ones may be fired with different materials. For example, for the sake of convenience in handling the combustion supporting materials and to eliminate heat losses which might result from conducting the hot gases for any considerable distances, the combustion chamber communicating with the lowermost passage might be readily accessible and, therefore, might be conveniently fired with a solid material, while the combustion chamber communicating with the uppermost passage might be made less accessible and, therefore, might be fired with a fluid material which can be readily conducted to desired points. The provision of separate combustion chambers would permit more accurate control of the supply of hot gases. Thus, one or more of the separate combustion chambers may be cut out when a lesser number will provide sufficient heat. In such cases, the use of fluid combustion supporting materials in the chambers most likely to be found unnecessary at times is advantageous because of the ease with which such fires may be cut out.

When solid carbonaceous materials are used for generating the drying gases, the use of traveling grate stokers is highly advantageous. The traveling grate stoker permits better control of the fire and eliminates losses of time in cleaning fires.

The baffles are preferably in the form of wheels with pockets formed on the inner and outer surfaces of the rims. The external diameters of the baffle wheels are slightly less than the width of the interior of the upper portion of the vertical tower. The rotary baffle wheels may be driven by any suitable means, such, for example, as outside chains and sprockets.

Stationary baffles may be used in conjunction with the rotary baffles. Thus, rotary baffles may be used in those portions of the upper part of the drying chamber in which the material is normally wettest and most inclined to cake or bridge, and stationary baffles may be used in those lower portions of the chamber which the material reaches in a partly dried condition so that the caking or bridging tendency has been eliminated.

The invention will be better understood from a consideration of the following description, taken in conjunction with the accompanying drawings, in which:

Fig. 4 is a fragmentary view of the rim of the rotary baffle wheel, partly in section, and showing the pockets formed on the inner and outer surfaces of the rim;

Fig. 5 is a side elevation of a rotary baffle wheel; and

Fig. 6 is an end elevation, partly in section, of a rotary baffle wheel.

Figure 1:
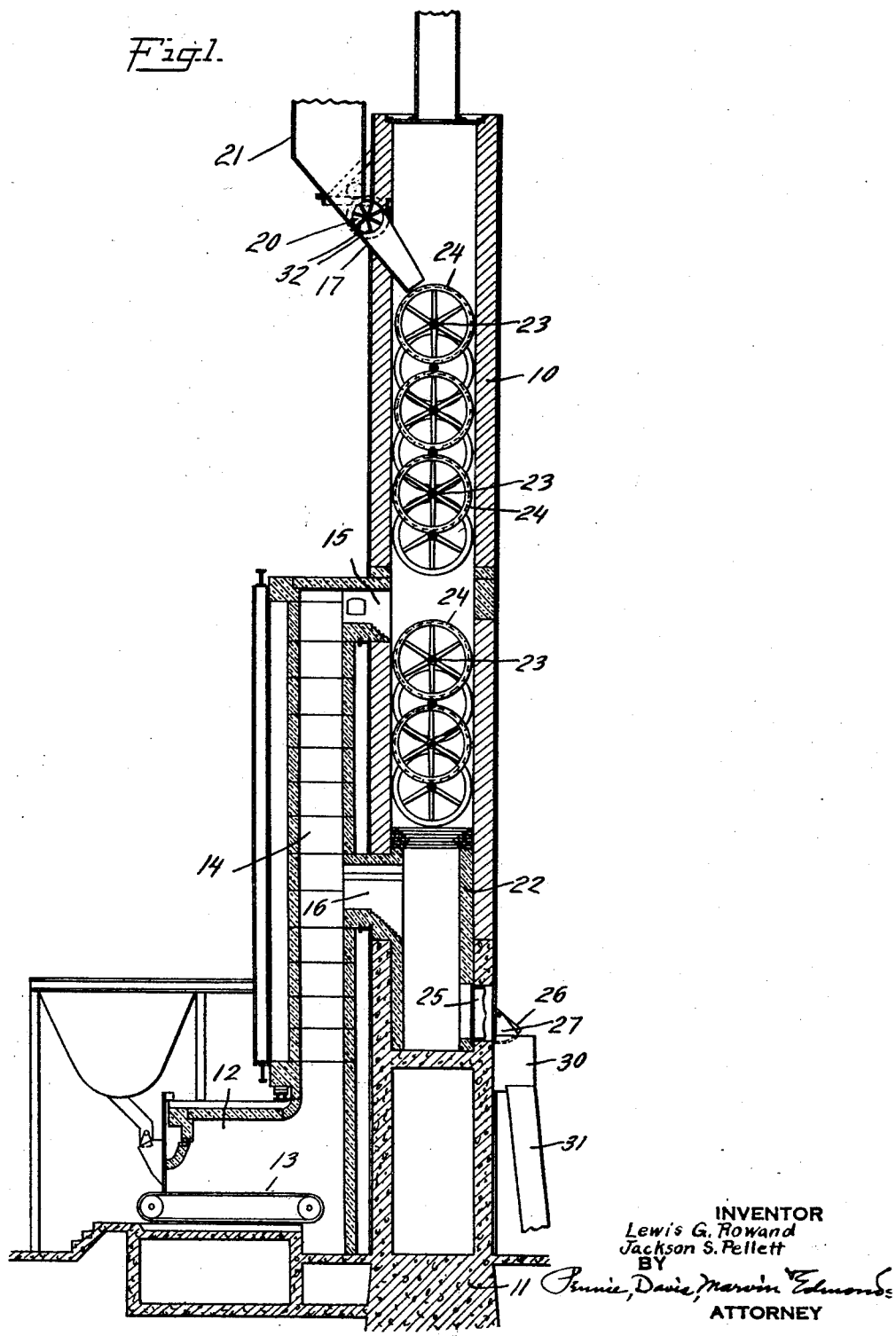
Fig. 1 is a vertical section of drying apparatus embodying the invention.
Figure 2:
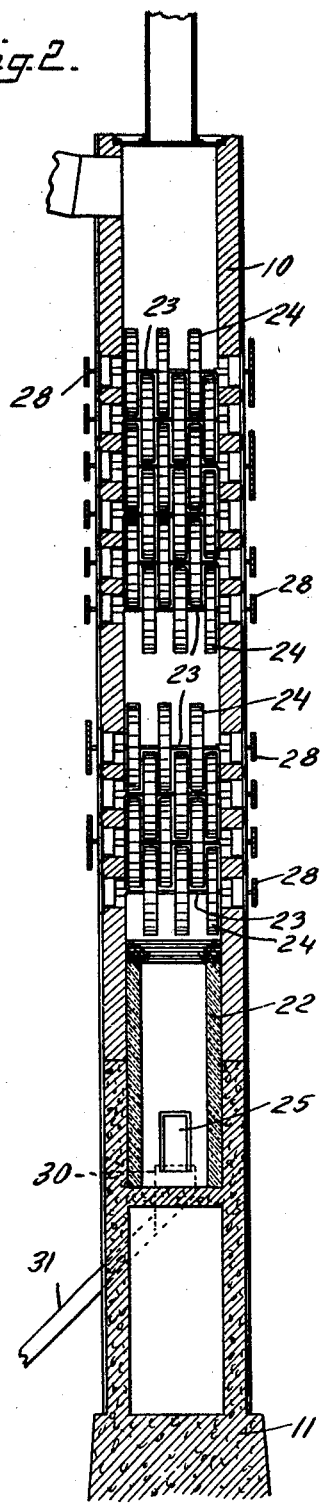
Fig. 2 is a vertical section taken substantially at right angles to that shown in Fig. 1 and showing the arrangement of baffles.
Figure 3:
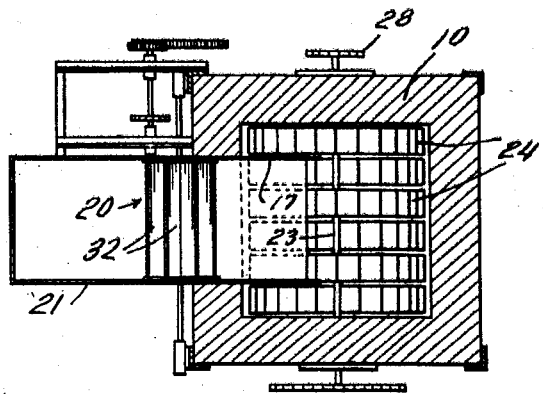
Fig. 3 is a sectional plan showing the relative positions of the feeder and baffles.

The apparatus shown in the drawings comprises a vertical drying tower 10 supported upon a suitable foundation 11. Drying gas generating means is disposed adjacent the bottom of the tower and comprises a combustion chamber 12, for solid carbonaceous material, provided with a travelling grate stoker 13 and communicating with the interior of the drying tower through a flue 14 and vertically spaced passages 15 and 16. Means for feeding material to be dried to the drying tower is disposed adjacent the top of the tower and comprises a chute 17, rotary feeder 20, and feed hopper 21.

The drying tower may be formed of any suitable material, such, for example, as bricks, or a metal shell lined with bricks. The interior of the upper portion of the tower is rectangular in plan. The interior of the lower portion of the drying tower may be of any desired outline, and it is preferably provided with a lining or wall 22 of heat refractory material which serves to protect the outer walls from the heat of the entering gases and the dried material which falls to the bottom of the drying tower. The portion of the tower adjacent the uppermost gas entrance passage is also preferably lined with heat refractory material.

A plurality of shafts 23, having baffle wheels 24, rigidly mounted thereon in spaced relationship, are mounted in bearings in opposite side walls of the upper portion of the tower for rotation about horizontal axes. Driving means such, for example, as sprockets 28 are mounted on the outer ends of the baffle supporting shafts and suitably connected to a source of driving power (not shown). The baffle supporting shafts are mounted in two spaced groups, one group above the gas entrance passage 15 and one group below said passage. The baffle wheels are of slightly lesser diameter than the distance between the opposite side walls of the drying tower adjacent their peripheral edges. The spaces between the side walls and the peripheral edges of the baffle wheels are great enough to provide clearance for the baffle wheels during rotation, but insufficient to permit any considerable quantity of material to fall directly from the top to the bottom of the tower.

The baffle supporting shafts are spaced apart, vertically, distances slightly greater than the radii of the baffle wheels, and the baffle wheels on adjacent supporting shafts are staggered to permit the baffle wheels on each shaft to extend into spaces between the baffle wheels on the next adjacent shafts. The side faces of the intermeshing baffle wheels are spaced apart and the side faces of the baffle immediately adjacent the tower walls are spaced from the walls only sufficiently to provide clearance.

The bottom portion of the drying tower is provided with a discharge opening 25 communicating with a downwardly opening chute 26. A door 27 is pivotally mounted on the chute 26 and normally closes the discharge end of said chute. A hopper 30 is disposed beneath the chute 26 for receiving the dried material and directing it through the conduit 31 into suitable conveying apparatus (not shown).

The chute 17 of the feeding means extends through an opening in the side wall of the tower adjacent the top thereof. The discharge end of the chute 17 extends to a point immediately above the uppermost baffle wheels and substantially midway between the vertical center and a side wall of the tower. The rotary feeder 20 comprises a central shaft mounted for rotation about a horizontal axis and having blades 32 mounted thereon. The rotary feeder 20 is mounted within a casing which joins the chute 17 and the hopper 21 and the peripheral and end edges of the blades 32 are spaced from the walls in said casing only a sufficient distance to provide clearance. The rotary feeder 20 may be driven in any suitable manner.

The rotary baffle wheels may be formed as integral castings, but they are preferably constructed of a number of separate pieces, which construction permits the selection of suitable types of materials for those portions which require special materials because of unusual conditions. Cast iron rotary baffle wheels have been used successfully, but it has been found that as a result of temperature changes cracks are developed in the rim portions. The present preferred type of the rotary baffle wheel consists of a semi-steel casting 33 comprising a hub and spokes, and a rim 34 built up of structural steel plates and angles. The spokes are provided with flanged end portions 35 and a steel band 36 is bolted or riveted or otherwise attached to the flanges 35 to provide a rim for the wheel. Steel angles 37 and 40 are attached to the inner and outer surfaces of the rim band 36 at the edges thereof. Steel strips 41 extend transversely between the upwardly projecting walls of the angles 37 and 40 and form pockets on the inner and outer surfaces of the rim. The angles 37 and 40 and strips 41 may be attached to the rim 36 in any suitable manner, such, for example, as by bolts or rivets or welding.

In the operation of the apparatus shown in the drawings, material to be dried is delivered to the feed hopper 21 and fed to the drying chamber by means of the rotary feeder 20 and chute 17. The rate of feed will depend upon the capacity of the drying apparatus. An excess of material may be maintained in the feed hopper and this excess, in conjunction with the blades of the rotary feeder, functions to inhibit the ingress or egress of gases during drying operations.

The combustion apparatus is operated to produce drying gases at the rate and temperature required.

The baffle wheels are rotated slowly, about four revolutions per minute. Alternate pairs of baffle wheel supporting shafts are rotated in opposite directions. This method of operation results in the material following a tortuous path from side to side of the drying chamber as it passes downwardly therethrough, and prevents bridging of the wet material. The pockets formed on the rims of the baffle wheels serve to retain a large portion of the material being dried for considerable periods of time. This fact permits the maintenance of lower temperature in the drying chamber and permits the discharge of dried material at lower temperatures.

The usual means for removing waste gases from the drying chamber may be employed.

We claim:

1. Drying apparatus comprising a drying chamber, means for feeding material to be dried to said drying chamber, means for introducing drying gases into said drying chamber, and baffle wheels having pockets formed on the inner and outer surfaces of their rims mounted in vertically overlapping relation for rotation within said drying chamber.

2. Drying apparatus comprising a drying chamber, means for feeding material to be dried to said chamber adjacent the top thereof, means for introducing drying gases into said drying chamber adjacent the bottom thereof, and a plurality of series of spaced baffle wheels having pockets formed on their rim portions mounted for rotation within said drying chamber, the baffle wheels of one series extending into the spaces between the baffle wheels of the adjacent series.

3. In drying apparatus, a rotary baffle comprising a hub having radial spokes, a flat band rigidly attached to the ends of the spokes, angles fastened to each edge of the band and having a flange extending radially outward, and strips extending transversely of the band and between the flanges, the arrangement being such as to define a series of pockets on the band.

4. In drying apparatus, a baffle comprising a wheel having a rim, and pockets formed on the inner and outer surfaces of said rim.

5. An apparatus for subjecting materials to the action of gases comprising a gas chamber, an inlet for introducing a gas at one end of the chamber, an outlet for the gas at the other end of the chamber, a plurality of series of spaced rotatable baffle wheels located within the chamber between the gas inlet and outlet and having material-arresting means thereon, the wheels of one series extending into the spaces between the baffle wheels of the adjacent series, the arrangement being such that the axes of all the wheels lie substantially in a common plane, and means for discharging material into the chamber onto the baffle wheels.

6. An apparatus for subjecting materials to the action of gases comprising a gas chamber, an inlet for introducing a gas within the chamber, an outlet for removing the gas from the chamber, a pair of spaced baffle wheels within the chamber provided with material-arresting means, a baffle wheel mounted on a separate axis extending into the space between and overlapping the pair of first-mentioned wheels, said latter wheel also being provided with material-arresting means, the wheels being so constructed as to provide an unobstructed opening for the passage of the gas through a substantial portion of their overlapping area, and means for discharging material into the chamber onto the baffle wheels.

7. An apparatus for subjecting materials to the action of gases comprising a gas chamber, an inlet for introducing a gas within the chamber, an outlet for removing the gas from the chamber, a pair of spaced baffle wheels within the chamber provided with material-arresting means, a baffle wheel mounted on a separate axis extending into the space between and overlapping the pair of first-mentioned baffle wheels, said latter wheel also being provided with material-arresting means, the wheels being so constructed as to provide an unobstructed opening for the passage of the gas through a substantial portion of their overlapping area, the axes of the wheels lying substantially in a common plane and their circumferences extending into close proximity with the walls of the chamber, and means for discharging material into the chamber onto the baffle wheels.

In testimony whereof we affix our signatures.

LEWIS G. ROWAND.
JACKSON S. PELLETT.